D. B. LORING.

Assignor, by mesne Assignments, to J. E. WHEELER, J. E. & C. W. RUSSELL, trustees

Machine for Making Horseshoe-Nails.

No. 8,302. Reissued June 25, 1878.

WITNESSES
F. F. Raymond 2d
A. J. Oettinger

INVENTOR.
David B. Loring

N. PETERS, PHOTO-LITHOGRAPHER, WASHINGTON, D. C.

UNITED STATES PATENT OFFICE.

DAVID B. LORING, OF BOSTON, MASSACHUSETTS, ASSIGNOR, BY MESNE ASSIGNMENTS, TO JOHN E. WHEELER, JOHN E. RUSSELL, AND CHARLES W. RUSSELL, TRUSTEES.

IMPROVEMENT IN MACHINES FOR MAKING HORSESHOE-NAILS.

Specification forming part of Letters Patent No. 184,719, dated November 28, 1876; Reissue No. 8,302, dated June 25, 1878; application filed November 20, 1877.

*To all whom it may concern:*

Be it known that I, DAVID B. LORING, of Boston, in the county of Suffolk and State of Massachusetts, have invented an Improvement in the Manufacture of Horseshoe-Nails, of which the following is a specification:

This invention relates to the manufacture of horseshoe-nails from blanks cut or punched from a nail-plate of any desirable shape; and consists of mechanism for feeding said blanks to revolving dies adapted to form the head and lengthen the shank of the blank; in the means for centering said blank in the revolving dies, as hereinafter set forth; and in a device for stripping the rolled blank from the dies.

Figure 1:
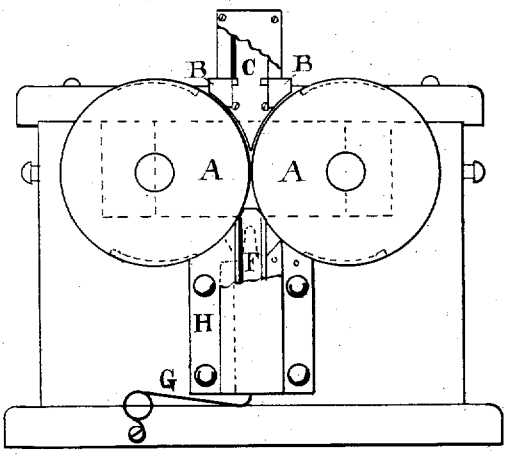
Figure 2:
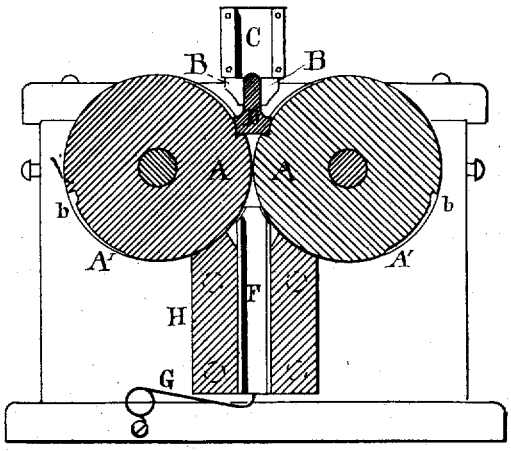
Figure 3:
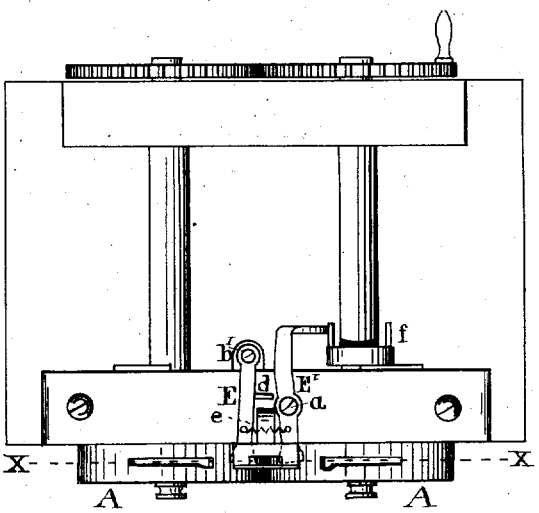

Reference is made to the accompanying drawing, forming a part of this specification, in explaining the nature of my invention, in which Figure 1 is an end elevation of a machine, showing my invention. Fig. 2 is a vertical cross-section of the same on the line *x x* of Fig. 3. Fig. 3 is a plan, showing particularly the method of feeding the blanks.

The rolls A are provided on their peripheries with the sectional dies A′, which are conversely shaped to each other, and arranged so that the head-forming recesses first converge as the rolls revolve.

The blank is fed, head first, to the dies A′ through a chute or feed-tunnel, C. As the head-forming portion of the blank is the part first acted upon or shaped by the dies, consequently it is necessary that the blank should drop vertically on the rolls slightly in advance of the converging of the dies, and that it should be supported in a vertical position while being drawn into them.

To provide these vertical supports for preventing the shank of the blank from tipping or falling against the sides of the feed-tunnel as it is being seized and drawn into the dies, I arrange just above the point of the convergence of the dies in the lower end of the feed-tunnel C a centering device consisting of two guides, B, which preferably open and close horizontally to and from the center of the feed-tunnel, and are automatically actuated by levers E and E′, one of which—the operating lever E′—contacts with the pins *f* on one of the shafts driving the rolls, and is thereby positively actuated. This lever E′ is pivoted at *a*, and the lever E is pivoted at *b′*; and the pin *d*, projecting from said lever, and spring *e*, acting in conjunction with each other and with the operating-lever E′, cause lever E to move the guide B on its free end the same relative distance from and to the center of the feed-tunnel that is given its accompanying guide B on the end of lever E′. These guides B also act as a detent in preventing the blank from dropping on the rolls till just before the dies converge, when they open to drop the blank, and afterward close to support the shank in a perpendicular position.

The delivering-tunnel F is held against the rolls by the spring G, and the frame H, which forms a guide for the tunnel, and within which it operates, is extended to contact with the periphery of the rolls, the upper inner corner being cut away, as shown.

The object of this last-named construction is to furnish means for stripping the dies of any blanks which remain in either die, as the head of any blank thus remaining contacts with the top of tunnel F, which is forced down thereby until the blank contacts with the upper inner corner of the frame H, when it is stripped from the die and drops through the tunnel, which, by the action of spring G, is returned to its position against the rolls at the point of the divergence of the dies.

It will be observed that the dies operate upon the edge of the blank, instead of upon the face and back thereof, and that by said operation the head-forming portions are compressed laterally, and that the shank-forming portion is also compressed laterally, thereby thickening the head.

The operation of the machine is as follows: The blank D is dropped, with its head-forming portion downward, into the feed-tunnel C upon the guides B, (which now serve as a detent,) which are caused to open just before the dies A′ converge, thus permitting the blank to drop upon the rolls in season to be seized by the dies. The divided detent or guides then close upon the shank of the blank, and support it in such a position that the head-forming portion of the blank not only is centered in the head-forming parts of the dies, but the shank also is held in a vertical position while being drawn into the dies as the rolling action of the dies continues. After this centering of the blank the centering-guides act as a detent in preventing the fall of the next succeeding blank until they open to permit the blank to fall, when they again serve as a centering mechanism. The dies operate in shaping the blank, as above described, by first upsetting the head by a transverse compression exerted upon the edge thereof, and then elongating the shank by a continuation of the transverse pressure on the edge of the shank of the blank.

The apparatus for stripping the dies operate as above set forth.

Various modifications as substitutes for the centering device described might be mentioned, and I do not therefore confine myself to the particular construction and operation above described.

The advantage arising from the use of a centering device which may or may not perform the office of a detent is that the rolled blank leaves the dies perfectly straight, and very seldom sticks therein; and this result is obtained by supporting the blank vertically as it is drawn into the dies, not allowing it to tip in the least, thereby providing for a uniform degree of compression on each edge of the blank.

I am aware that it is common in the state of the art to use a blank having projections on the edge and the front of the shank of the blank to form the head of the finished nail, that said blank is cut from a ribbed metal plate, and that it is designed that the head-forming portion shall not be upset in the dies; but the same is not the purpose of my invention, as I design to upset and completely shape the head of the blank in the dies, as well as draw out the shank.

What I claim, and desire to secure by Letters Patent of the United States, is—

1. In a machine for making horseshoe-nails, the combination of a feed-tunnel, C, automatic guides B, arranged to operate between said tunnel and the rolls, and the revolving dies A′, all arranged substantially as and for the purpose described.

2. The combination of the guides B, levers E E′, spring *e*, and pin *d* with the pins *f*, substantially as shown and described.

3. The combination of the tunnel F, spring G, and frame H with the revolving dies A′, substantially as set forth.

4. The combination of an automatic centering device, the revolving dies, and an automatic delivering apparatus, substantially as and for the purpose set forth.

5. The combination of a feed-tunnel, a combined detent and centering device, and revolving dies, as set forth.

6. The combination of a feed-tunnel, a divided detent, and revolving dies, substantially as described.

7. In a machine for the manufacture of horseshoe-nails having a stationary feed-tunnel and revolving dies, an automatically-acting device in the lower part of said tunnel for vertically supporting a blank while it is being drawn into the dies, as described.

8. In a machine for manufacturing horseshoe-nails, a device for centering the blank in revolving dies arranged immediately above the converging point of said dies, in combination with an independent tunnel for conveying blanks to said centering device, for the purpose set forth.

DAVID B. LORING.

Witnesses:
F. F. RAYMOND, 2d,
A. J. OETTINGER.